(No Model.)
S. E. MALLETT.
Gate Roll.
No. 233,529. Patented Oct. 19, 1880.
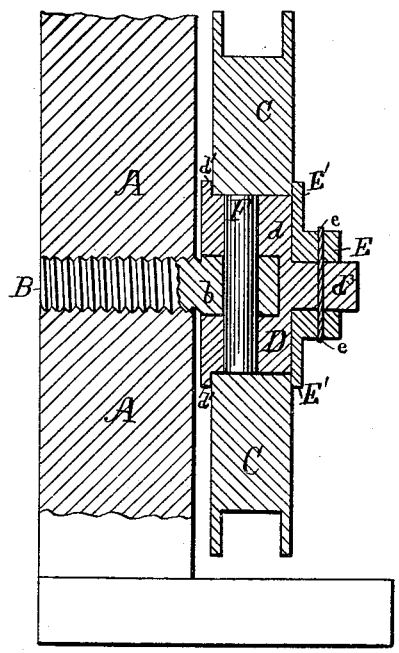
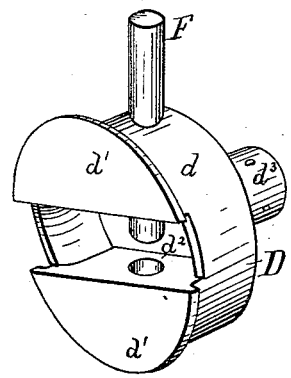
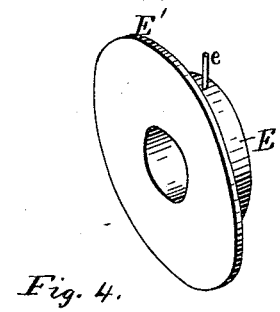
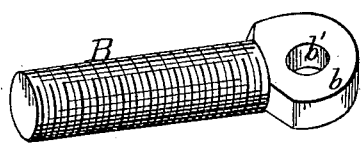
Witnesses:
W. B. Masson
J. S. Barker.
Inventor
Sidney E. Mallett
by Doubleday & Bliss
att'ys

UNITED STATES PATENT OFFICE.

SIDNEY E. MALLETT, OF AKRON, ASSIGNOR OF ONE-HALF OF HIS RIGHT TO ELI MILLER, OF CANTON, OHIO.

GATE-ROLL.

SPECIFICATION forming part of Letters Patent No. 233,529, dated October 19, 1880.

Application filed July 29, 1880. (No model.)

*To all whom it may concern:*

Be it known that I, SIDNEY E. MALLETT, of Akron, in the county of Summit and State of Ohio, have invented certain new and useful Improvements in Gate-Rolls; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a gate-roll the parts of which shall be of such character that they can be easily cast, can be firmly connected, can resist wear and breakage to the greatest advantage, and can be supported close to the post.

Figure 1 is a vertical section of my improved gate-roll. Fig. 2 is a perspective of the pivoted bearing for the roll. Fig. 3 is a perspective of the outer clamping-collar. Fig. 4 is a perspective of the bolt.

In the drawings, A represents the hinge-post upon which the gate is supported. The roll is attached to post A by a bolt, B, which, owing to the peculiar construction of the other parts of the device, can be inserted far enough to bring the roll and gate close up to the post, and thus prevent the bending of the bolt, and give the gate a firm support. The bolt is formed with a flattened head, $b$, to which the roll is pivotally connected.

C represents the roll, which in itself is substantially similar to those now known. It is connected to the bolt B by means of a single intermediate piece, D, upon which it is mounted.

The intermediate piece D is constructed to have a continuous cylindrical bearing-surface, $d$, for the roll C. It is cast with flanges $d'$, projecting from its inner face, and adapted to form part of a way for the roll. It is also cast with a socket, $d^2$, in its inner side, which forms a seat for the head $b$ of the bolt B.

$d^3$ is a stud projecting from the outer side of the bearing-piece D, and E is a clamping-ring fitting upon this stud, and formed with a projecting flange, E′, arranged to bear against the outer face of the roll C. The clamping-ring is held in place by a pin, $e$, passing through the ring and the stud $d^3$.

The bolt B is held in place within and is pivoted to the bearing-piece D by a pin, F, passing through the part D and the aperture $b'$ in the flattened end $b$ of the bolt.

I am aware that supports for gate-rolls have been used consisting of a bolt cast with pivot-studs on each side of the head, combined with two or more intermediate pieces between the bolt-head and the roll, the parts being so related that the roll must be moved toward the post in order to remove the gate, and I do not claim such devices; but my construction has many obvious advantages over those heretofore used. The roll and gate can be separated from the bolt and post by removing the pin $e$ and the ring E and sliding the gate away from the post, and therefore the bolt may be inserted far enough to bring the gate close to the post, and thus provide the firmest support possible. Moreover, my improved bearing-piece D avoids the wear and looseness incident to those constructions having a bearing formed of several pieces.

What I claim is—

The gate-roll herein described, consisting of the fixed bolt B, having its flattened end provided with the aperture $b'$, the roller C, and the bearing-piece D, pivoted by the pin F passing through the bolt, and formed with the flanges $d'$, the socket $d^2$, and the stud $d^3$, in combination with the detachable ring E, having the flange E′, arranged to bear against the outside of the roll, substantially as set forth.

In testimony that I claim the foregoing I have hereunto set my hand.

SIDNEY E. MALLETT.

Witnesses:
 HENRY PURDY,
 JOHN McCOURT.